United States Patent
Beals et al.

(10) Patent No.: US 12,227,463 B2
(45) Date of Patent: Feb. 18, 2025

(54) ENVIRONMENTAL BARRIER COATING AND METHOD OF FORMING THE SAME

(71) Applicant: RAYTHEON TECHNOLOGIES CORPORATION, Farmington, CT (US)

(72) Inventors: James T. Beals, West Hartford, CT (US); Richard Wesley Jackson, Mystic, CT (US); Xia Tang, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 824 days.

(21) Appl. No.: 17/314,448

(22) Filed: May 7, 2021

(65) Prior Publication Data

US 2024/0002300 A1    Jan. 4, 2024

(51) Int. Cl.
*C04B 41/45* (2006.01)
*C04B 41/00* (2006.01)
*C04B 41/50* (2006.01)
*C04B 41/52* (2006.01)

(52) U.S. Cl.
CPC ...... *C04B 41/4539* (2013.01); *C04B 41/0072* (2013.01); *C04B 41/455* (2013.01); *C04B 41/5071* (2013.01); *C04B 41/52* (2013.01); *C04B 2235/3891* (2013.01); *C04B 2235/428* (2013.01); *C04B 2235/5292* (2013.01)

(58) Field of Classification Search
CPC ............ C04B 41/4539; C04B 41/0072; C04B 41/455; C04B 41/5071; C04B 41/52; C04B 2235/3891; C04B 2235/428; C04B 2235/5292; C04B 41/009; C04B 41/5024; C04B 41/5035; C04B 41/87; C04B 41/89; F01D 25/005; F01D 5/282; F01D 5/288; F05D 2230/90; F05D 2300/603; C23C 28/324; C23C 28/34; C23C 24/082
See application file for complete search history.

(56) References Cited

U.S. PATENT DOCUMENTS

| | | |
|---|---|---|
| 9,428,650 B2 | 8/2016 | Meschter et al. |
| 9,969,655 B2 | 5/2018 | Wan et al. |
| 10,577,950 B2 | 5/2020 | Landwehr et al. |

(Continued)

FOREIGN PATENT DOCUMENTS

WO     2022245562     11/2022

OTHER PUBLICATIONS

International Search Report and Written Opinion for International Patent Application No. PCT/US2022/28272 dated Feb. 6, 2023.

(Continued)

*Primary Examiner* — Michael G Miller
(74) *Attorney, Agent, or Firm* — Carlson, Gaskey & Olds, P.C.

(57) ABSTRACT

A method of applying a coating to a substrate includes forming a slurry by mixing elemental precursors of gettering particles, diffusive particles, matrix material, and a carrier fluid; applying the slurry to a substrate; and sintering the slurry to form a composite material. The sintering causes the elemental precursors to react with one another to form gettering particles. An article is also disclosed.

14 Claims, 5 Drawing Sheets

(56) References Cited

U.S. PATENT DOCUMENTS

| | | |
|---|---|---|
| 2005/0112381 A1* | 5/2005 | Raybould ............. C23C 28/042 |
| | | 427/430.1 |
| 2016/0332922 A1 | 11/2016 | Tang et al. |
| 2017/0335118 A1 | 11/2017 | Tang et al. |
| 2019/0119803 A1 | 4/2019 | Tang et al. |
| 2020/0056488 A1 | 2/2020 | Jackson et al. |
| 2020/0199031 A1 | 6/2020 | Luthra et al. |
| 2021/0040003 A1 | 2/2021 | Smyth et al. |
| 2021/0246080 A1* | 8/2021 | Jackson .................. F01D 5/288 |
| 2021/0246082 A1* | 8/2021 | Jackson .................. C04B 41/85 |
| 2021/0331984 A1 | 10/2021 | Sudre et al. |

OTHER PUBLICATIONS

International Preliminary Report on Patentability for International Patent Application No. PCT/US2022/28272 dated Nov. 16, 2023.

\* cited by examiner

ENVIRONMENTAL BARRIER COATING AND METHOD OF FORMING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

A method of applying a coating to a substrate according to an exemplary embodiment of this disclosure, among other possible things includes forming a slurry by mixing elemental precursors of gettering particles, diffusive particles, matrix material, and a carrier fluid; applying the slurry to a substrate; and sintering the slurry to form a composite material. The sintering causes the elemental precursors to react with one another to form gettering particles.

In a further example of the foregoing, the elemental precursors include silicon and the gettering particles are intermetallic silicides.

In a further example of any of the foregoing, the elemental precursors include silicon and a refractory metal.

In a further example of any of the foregoing, the method includes the step of applying a topcoat.

In a further example of any of the foregoing, the step of applying the topcoat is performed before the step of sintering the slurry.

In a further example of any of the foregoing, wherein the sintering is performed at a temperature between about 1000° C. and 1400° C. in an inert atmosphere.

In a further example of any of the foregoing, the method also includes the step of subjecting the slurry to a low-heat treatment prior to the sintering step. The sintering step is performed at a first temperature, and the low-heat treatment is performed at a second temperature lower than the first temperature.

In a further example of any of the foregoing, after the mixing step, the elemental precursors are embedded in one another.

In a further example of any of the foregoing, after the applying step, the elemental precursors are in an interconnected matrix.

In a further example of any of the foregoing, after the sintering step, the gettering particles have a platelet shape.

In a further example of any of the foregoing, the gettering particles have a major axis that is generally parallel to a surface of the substrate.

In a further example of any of the foregoing, after the sintering step, the gettering particles are arranged in an interconnected matrix.

In a further example of any of the foregoing, the slurry is aqueous.

In a further example of any of the foregoing, the substrate is a ceramic matrix composite material.

An article according to an exemplary embodiment of this disclosure, among other possible things includes a substrate and a barrier layer on the substrate. The barrier layer includes a matrix, diffusive particles, and gettering particles. The gettering particles are arranged in an interconnected matrix.

In a further example of any of the foregoing, the article also includes a topcoat disposed on the barrier layer.

In a further example of any of the foregoing, the gettering particles have a platelet shape.

In a further example of any of the foregoing, the gettering particles have a major axis that is generally parallel to a surface of the substrate.

In a further example of any of the foregoing, the gettering particles are intermetallic silicides.

In a further example of any of the foregoing, the substrate is a ceramic matrix composite material.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
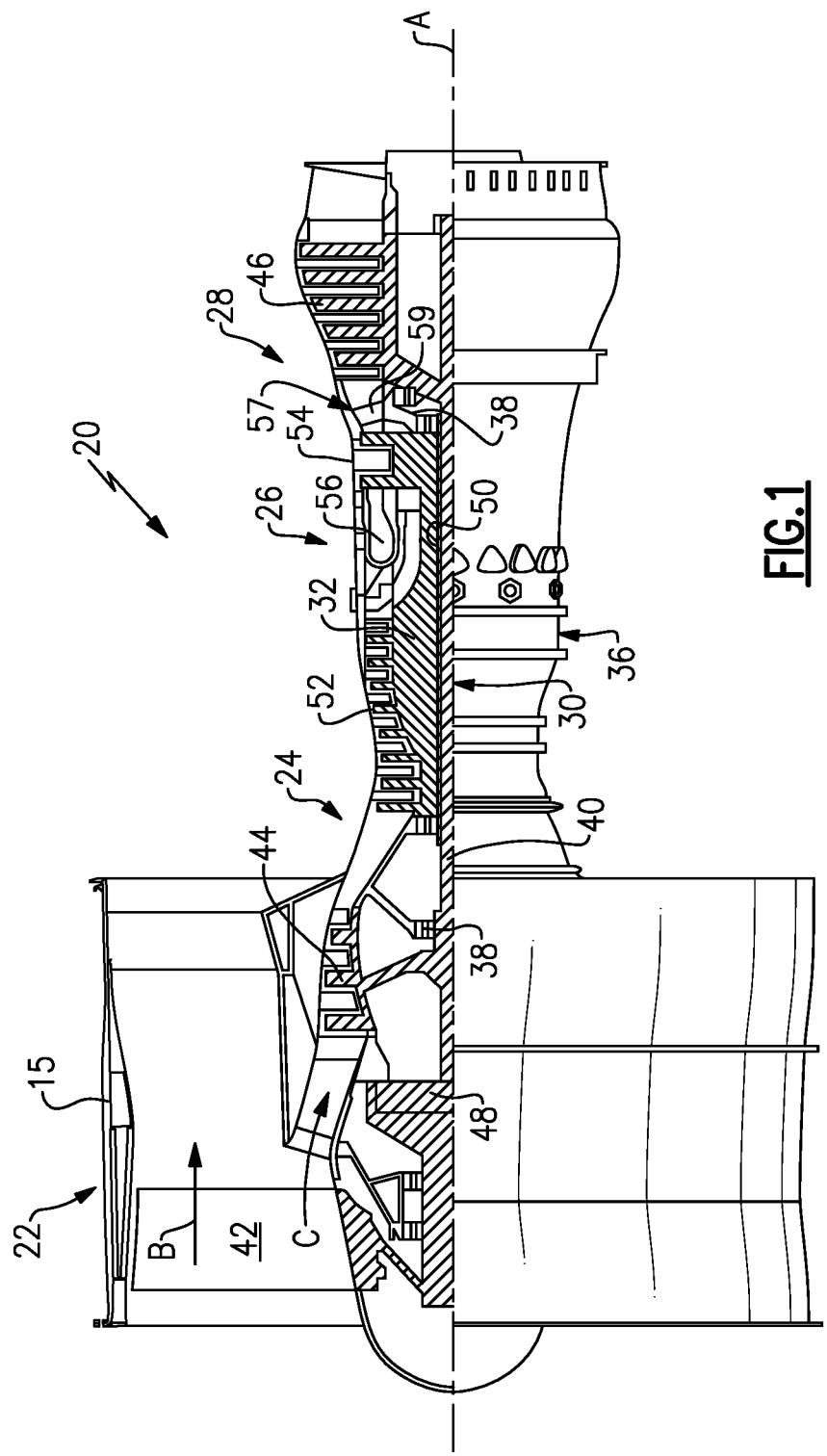
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
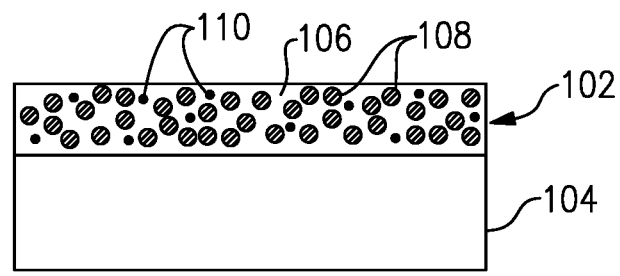
FIG. 2 schematically illustrates an example article with a barrier layer.

FIG. 2 schematically illustrates a representative portion of an example article 100 for the gas turbine engine 20 that includes a composite material 102 that is used as a barrier layer. The article 100 can be, for example, an airfoil in the compressor section 24 or turbine section 28, a combustor liner panel in the combustor section 26, a blade outer air seal, or another component that would benefit from the examples herein. In this example, the composite material 102 is used as an environmental barrier layer to protect an underlying substrate 104 from environmental conditions, as well as thermal conditions in some cases. The article 100 can be made from a ceramic-based material, such as a ceramic matrix composite (CMC) material, or a metallic material, such as a refractory metal or refractory metal alloy. As will be appreciated, the composite material 102 can be used as a stand-alone barrier layer, as an outermost/top coat with additional underlying layers, or in combination with other coating under- or over-layers, such as, but not limited to, ceramic-based topcoats.

The composite material 102 includes a matrix 106, a dispersion of "gettering" particles 108, and a dispersion of "diffusive" particles 110. The matrix 106 can be, in one example, silicon dioxide ($SiO_2$). Other possible matrices 106 include other silicates such as silicate glasses, partially crystalline glasses or crystalline silicates such as hafnium silicate or rare earth silicates. The barrier layer formed of the composite material 102 protects the underlying substrate 104 from oxygen and water, primarily in the form of steam. For example, the substrate 104 can be a ceramic-based substrate, such as a CMC material. The gettering particles 108 and the diffusive particles 110 of the barrier layer function as an oxygen and steam diffusion barrier to limit the exposure of the underlying substrate 104 to oxygen and/or steam from the surrounding environment. The gettering particles 108 are reactive with respect to oxidants and/or water and mitigate oxidants and/or water from diffusing through the barrier layer. Without being bound by any particular theory, the diffusive particles 110 enhance oxidation and steam protection by diffusing to the outer surface of the barrier layer opposite of the substrate 104 and forming a sealing layer that seals the underlying substrate 104 from oxygen/steam exposure. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. One example diffusive particle 110 is barium-magnesium alumino-silicate particles ("BMAS particles 110"), though other examples are contemplated.

Figure 3:
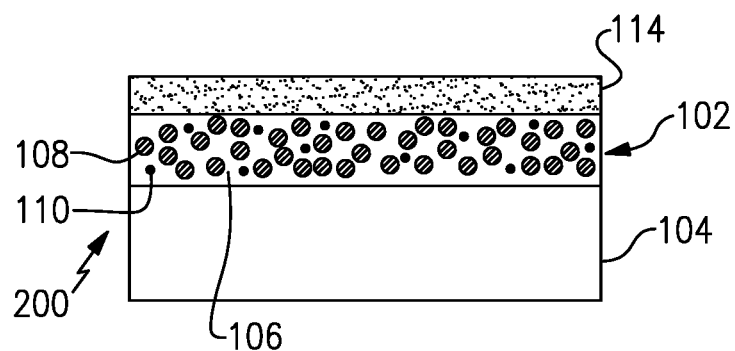
FIG. 3 schematically illustrates another example article with a barrier layer.

FIG. 3 shows another example article 200 that includes the composite material 102 as a barrier layer arranged on the substrate 104. In this example, the article 200 additionally includes a ceramic-based top coat 114 interfaced with the barrier layer. As an example, the ceramic-based top coat 114 can include one or more layers of an oxide-based material. The oxide-based material can be, for instance, hafnium-based oxides, yttrium-based oxides (such as hafnia, hafnium silicate, yttrium silicate, yttria stabilized zirconia or gadolinia stabilized zirconia), or combinations thereof, but is not limited to such oxides.

The gettering particles 108 are reactive with respect to oxidant particles and/or water, which could diffuse into the barrier layer 102. In this way, the gettering particles 108 could reduce the likelihood of those oxidant molecules from reaching and oxidizing the substrate 104. The gettering particles 108 generally include silicon, and in some particular examples are intermetallic silicides. The metal components can be refractory metals, in some examples. Refractory metals include Mo, W, Nb, Ta, Cr, Ti, Zr, Hf, V, and Y. Example intermetallic silicides are $MoSi_2$ and $WSi_2$. Complex or alloyed silicides are also contemplated, such as Mo—Ta—Si, Mo—W—Si, Mo—Si—C, or Mo—Si—B alloys. Some particular example complex alloyed silicides are $W_{0.4}Mo_{0.4}Cr_{0.2}Si_2$ and $W_{0.2}Ta_{0.2}Mo_{0.2}Nb_{0.4-x}\delta_xSi_2$; where δ is Ti, Hf, or Zr, and x is less than 0.1. Other complex alloyed silicides are also contemplated. The gettering particles 108 can include mixtures of silicides.

Figure 4:
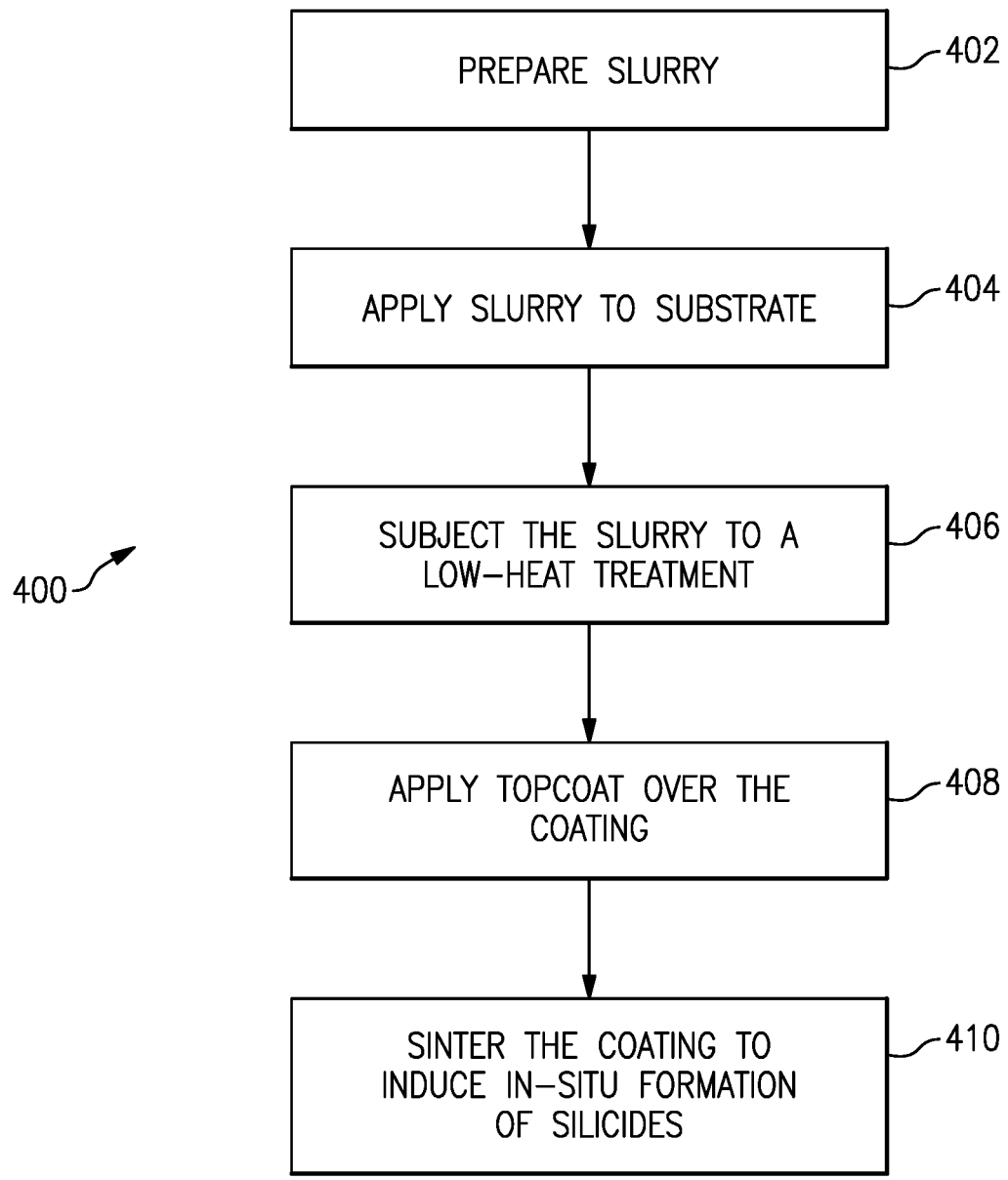
FIG. 4 schematically illustrates a method of applying a barrier layer to an article.

The composite material 102 can be fabricated by a slurry coating method 400, which is schematically shown in FIG. 4. In step 402, a slurry is prepared by mixing components for the gettering particles 108, diffusive particles 110, and matrix material 106 in a carrier fluid. The slurry can be aqueous, e.g., the carrier fluid is water or water-based. The components for the gettering particles 108 include elemental precursors for the desired silicide. For example, if the desired silicide is $MoSi_2$, the slurry includes elemental precursors Mo and Si. Some of the elemental precursors can be drawn from components of the diffusive particles 110/matrix 106. For instance, if the matrix 106 is or includes silica, elemental silicon can be silicon in the silica, though in other examples elemental silicon could also be added. Metallic elemental precursors can be in powder form. The slurry can be mixed by agitation or ball milling, or any other known method. The mixing encourages the elemental precursor materials to be near one another, touch, or become embedded in one another. For example, silicon can become embedded in Mo particles. This is known as "mechanical alloying."

In step 404, the slurry is applied to the underlying substrate 104 by painting, dipping, spraying, or any other known method.

In step 406, the slurry is subjected to a low-heat treatment at room temperature or at a slightly elevated temperature. This removes all or most of the carrier fluid and situates the other slurry components on the substrate 104 without sintering the slurry. The low-heat treatment is performed at temperatures substantially lower than the sintering temperatures in step 410, discussed below. In one example, the low-heat treatment is performed at temperatures of less than about 500° C. In one example, the slurry is dried and cured at about 200° C. for at least 15 minutes to ensure proper cross-linking of the coating. The low-heat treatment step can occur in an air environment.

In step 408, the topcoat 114 is applied over the coating after step 406. The topcoat can be applied by any known method. One particular example is plasma spraying. In other examples, the topcoat 114 can be applied after the sintering step 410 (discussed below).

In step 410, the coating from step 406 (with or without the topcoat 114) is sintered to form composite material 102. Sintering includes heating the coating to temperatures that exceed about 1000° C. in an inert atmosphere. The heating encourages reactions between the elemental precursors of the gettering particles 108 to react with one another and form the silicide gettering particles 108, which are already near one another, touching, or embedded in one another as a result of the mixing in step 402. As noted above, the elemental precursors could be separately added to the slurry or could be in other components such as the diffusive particles 110 and/or matrix 106. For instance, for $MoSi_2$, elemental Mo in the form of Mo powder could react with elemental silicon in the form of Si powder. In this way, the gettering particles 108 are formed in situ. These silicide-forming reactions are exothermic reactions, meaning as the reactions proceed they give off heat. Therefore, the sintering step 410 can occur at temperatures lower than traditional methods of forming composite material 102, where the gettering particles 108 are pre-fabricated and added to the slurry in step 402, by taking advantage of the exothermic silicide-forming reactions. For example, in the traditional method, the composite material 102 is sintered at temperatures of about 1500° C. or greater. In the instant method 400, the sintering step 410 can be performed at temperatures of about 100° C. to about 500° C. lower, e.g., at temperatures between about 1000° C. and about 1400° C., by taking advantage of the exothermic in situ formation of the silicide gettering particles 108. The lower curing temperature can improve the longevity of the underlying substrate 104, especially if the underlying substrate 104 is or includes a material that is sensitive to long-term exposure to very high curing temperatures.

Additionally, the in situ formation of silicide gettering particles 108 via the method 400 allows for the use of complex alloyed silicides, or combinations of silicides, by simply including the elemental precursor materials in the slurry. For instance, $MoSi_2$ and $Mo_5Si_3C$ gettering particles 108 can be formed by including carbon (or a carbon-containing component), silicon (or a silicon-containing component) and elemental Mo powder. A mixture of elemental Mo, Si, and C powders could be added to the slurry. Alternatively, $Mo_2C$, Mo, and Si powders could be added to the slurry. Mo—Ta-silicides can also easily be included just by adding elemental Ta powder to the slurry that contains elemental Mo and elemental Si powders. Other silicides, such as Ti-containing silicides, can be formed in a similar manner. Thus, a wider range of silicides and resulting properties (including gettering properties or other desirable properties such as thermal protection, mechanical strength, etc.) can be achieved, depending on the desired application for the composite material 102.

In some examples, energy other than heat energy can be applied to the coating in step 410 to assist in inducing the silicide-forming reactions discussed above. The energy can be in the form of sound energy or electrical energy, for instance.

In examples where the topcoat 114 is applied prior to the curing step 410, the topcoat 114 can have a thermal insulating effect during the curing step 410. In other words, the topcoat 114 can capture heat from the exothermic silicide-forming reactions in the coating. Elevated temperatures can in some examples reduce the time required for the curing step 410.

Figure 6:
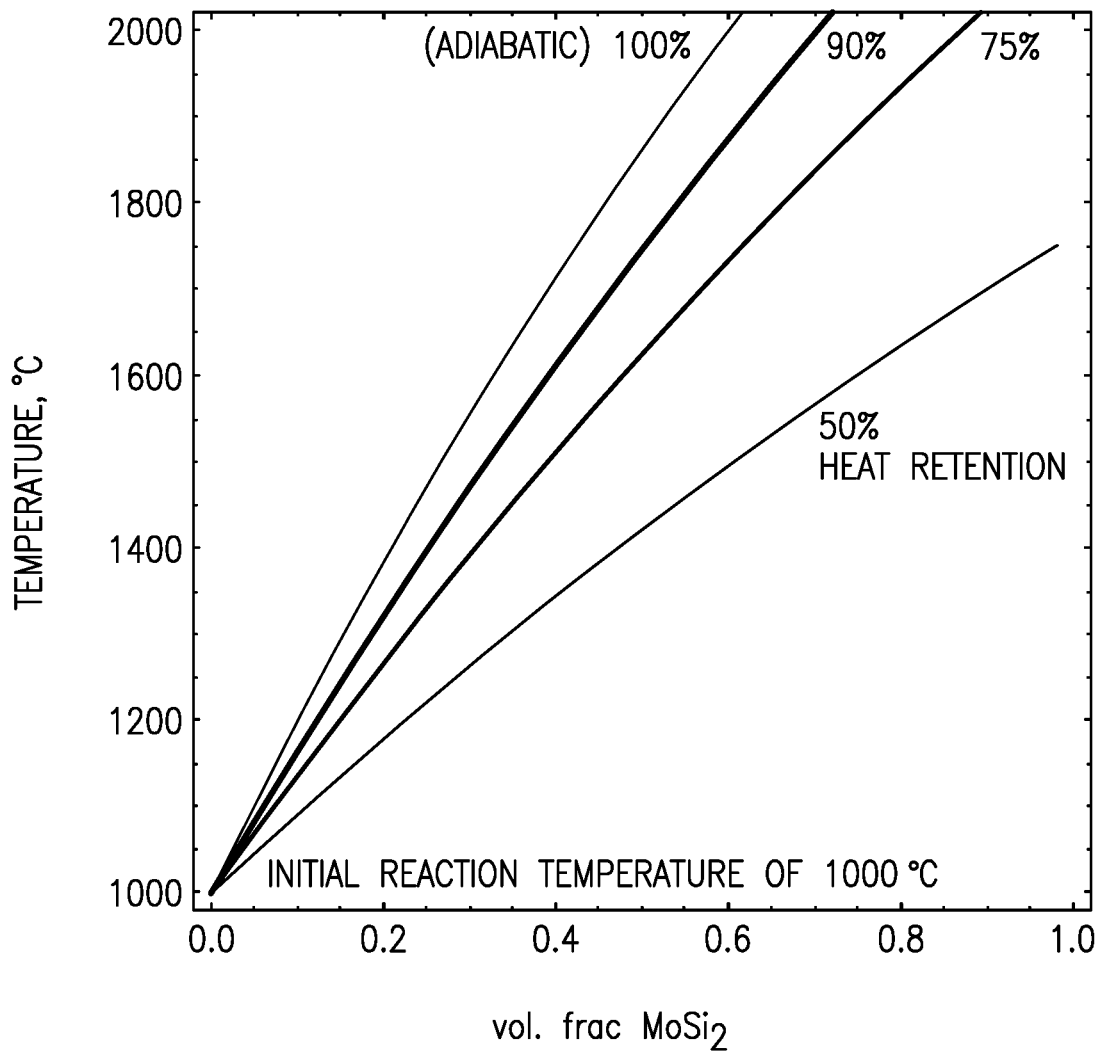
FIG. 6 schematically illustrates example temperatures achieved during sintering of the barrier layer due to exothermic reactions in the barrier layer.

The maximum temperature the slurry can reach due to the heat released by the exothermic silicide-forming reactions in step 410 discussed above depends upon the follow factors: (1) the temperature at which that reaction is initiated in the slurry (e.g., approximately the temperature at which the sintering step 410 takes place); (2) the volume fraction of the silicide-forming materials within the slurry (e.g., the volume fraction of the elemental precursors of the gettering particles 108); (3) the heat capacity of the constituents of the slurry; and (4) the thermal diffusivity of the adjacent layers to the slurry, e.g., the substrate 104 and/or topcoat 114. With these considerations, the temperature increase associated with the exothermic reaction can be controlled. An example of the limit case in which the adjacent layers are perfect insulators (adiabatic heating) assuming a sintering temperature of 1000° C. is presented in FIG. 6, along with examples where adjacent layers have 90%, 75%, and 50% heat retention. In this example, $MoSi_2$ is an elemental precursor of the gettering particles 108. As shown in FIG. 6, depending on the volume fraction of $MoSi_2$ in the slurry, the exothermic reactions can raise the temperature of the slurry significantly, up to about 2000° C. in some cases.

Figure 5:
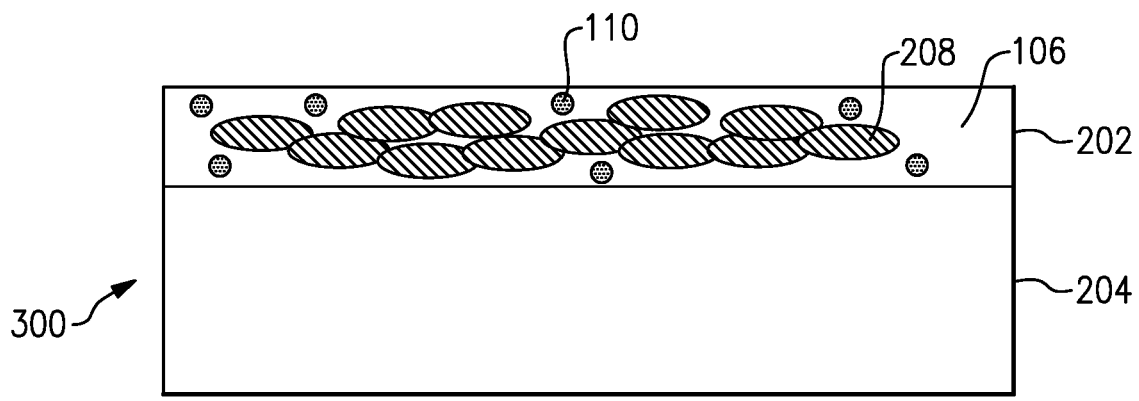
FIG. 5 schematically illustrates another example article with a barrier layer.

In one example shown in FIG. 5, another example component 300 has composite material 202 with silicide gettering particles 208 resulting from the method 400 with platelet-like shapes, e.g., the gettering particles 208 have an aspect ratio that is not equal to 1. The composite material 202 is disposed on a substrate 204. In some examples, the aspect ratio of the gettering particles 208 is less than about 5:1, and the gettering particles 208 comprise at least about vol. % of the composite material 202. In a particular example, a major axis of the platelet gettering particles 208 is substantially parallel to a surface of the substrate 104. Thus the platelet gettering particles 208 are substantially aligned with one another and with respect to the surface of the substrate 104. The common alignment of the platelet gettering particles 208 encourages the formation of an interconnected matrix of platelet gettering particles 208. The interconnected matrix can impart mechanical strength to the composite material 202. Additionally, the interconnected matrix of platelet gettering particles 208 has lower surface-area-to-volume ratio as compared to a dispersion of non-interconnected particles which provides less surface area that is available for reaction with oxidants as discussed above, and can therefore extend the duration through which the barrier layer 102 imparts oxidation resistance of the composite material 202. In some examples, the interconnected matrix of platelet gettering particles 208 can have a surface area to volume ratio of less 200,000:1 meters$^{-1}$.

In general, the silicide gettering particles 208 have a shape that tracks the shape of the elemental precursor components after the mixing in step 402 discussed above. Some mixing processes, such as ball milling, can encourage the formation of the platelet-like shapes. Moreover, the gettering particles 208 form in a location within the composite material 202 that is generally the same location as the location of the elemental precursors after the applying step 202 discussed above.

The example component 300 can optionally include the topcoat 114 as discussed above.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of applying a coating to a substrate, comprising:
    forming a slurry by mixing elemental precursors of gettering particles, diffusive particles, matrix material, and a carrier fluid;
    applying the slurry to a substrate; and
    sintering the slurry to form a composite material, whereby the sintering causes the elemental precursors to react with one another to form gettering particles.

2. The method of claim 1, wherein the elemental precursors include silicon and the gettering particles are intermetallic silicides.

3. The method of claim 2, wherein the elemental precursors include silicon and a refractory metal.

4. The method of claim 1, further comprising the step of applying a topcoat.

5. The method of claim 4, wherein the step of applying the topcoat is performed before the step of sintering the slurry.

6. The method of claim 1, wherein the sintering is performed at a temperature between about 1000° C. and 1400° C. in an inert atmosphere.

7. The method of claim 1, further comprising the step of subjecting the slurry to a low-heat treatment prior to the sintering step, and wherein sintering step is performed at a first temperature, and the low-heat treatment is performed at a second temperature lower than the first temperature.

8. The method of claim 1, wherein after the mixing step, the elemental precursors are embedded in one another.

9. The method of claim 1, wherein after the applying step, the elemental precursors are in an interconnected matrix.

10. The method of claim 1, wherein after the sintering step, the gettering particles have a platelet shape.

11. The method of claim 10, where the gettering particles have a major axis that is generally parallel to a surface of the substrate.

12. The method of claim 11, wherein after the sintering step, the gettering particles are arranged in an interconnected matrix.

13. The method of claim 1, wherein the slurry is aqueous.

14. The method of claim 1, wherein the substrate is a ceramic matrix composite material.

* * * * *